(12) United States Patent
Thackston et al.

(10) Patent No.: US 11,548,154 B2
(45) Date of Patent: Jan. 10, 2023

(54) SYSTEMS AND METHODS FOR DIMENSIONALLY-RESTRICTED ROBOTIC TELEOPERATION

(71) Applicant: Toyota Research Institute, Inc., Los Altos, CA (US)

(72) Inventors: Allison Thackston, San Jose, CA (US); Sam Zapolsky, San Francisco, CA (US); Katarina Bouma, Palo Alto, CA (US); Laura Stelzner, Mountain View, CA (US); Ron Goldman, Los Altos, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 509 days.

(21) Appl. No.: 16/159,302

(22) Filed: Oct. 12, 2018

(65) Prior Publication Data

US 2020/0114514 A1 Apr. 16, 2020

(51) Int. Cl.
*B25J 9/00* (2006.01)
*B25J 9/16* (2006.01)

(52) U.S. Cl.
CPC ........... *B25J 9/1689* (2013.01); *B25J 9/1666* (2013.01); *B25J 9/1697* (2013.01)

(58) Field of Classification Search
CPC ....... B25J 9/1689; B25J 9/1666; B25J 9/1697
USPC ...................................................... 701/245
See application file for complete search history.

(56) References Cited

U.S. PATENT DOCUMENTS

| 7,209,803 | B2 | 4/2007 | Okamoto et al. |
| 9,643,796 | B2 | 5/2017 | Koga et al. |
| 9,724,825 | B2 | 8/2017 | Iwatake |
| 9,981,380 | B2 | 5/2018 | Setsuda et al. |
| 2017/0106537 | A1* | 4/2017 | Chizeck ................. B25J 9/1689 |
| 2018/0117766 | A1 | 5/2018 | Atohira et al. |

FOREIGN PATENT DOCUMENTS

| JP | 3924495 B2 | 6/2007 |
| JP | 2015-123560 A | 7/2015 |
| WO | 2018/063100 A2 | 4/2018 |

OTHER PUBLICATIONS

Kensuke Harada et al., "Validating an object placement planner for robotic pick-and-place tasks", ScienceDirect, Robotics and Autonomous Systems, vol. 62, Issue 10, Oct. 2014, https://www.sciencedirect.com/science/article/pii/S0921889014001092#f000005, pp. 1463-1477.

(Continued)

*Primary Examiner* — Tyler J Lee
*Assistant Examiner* — Tiffany P Ohman
(74) *Attorney, Agent, or Firm* — Dinsmore & Shohl LLP

(57) ABSTRACT

A method includes providing a virtual representation of an environment of a robot, the virtual representation including an object representation of an object in the environment. The method further includes receiving manipulation input from a user to teleoperate the robot for manipulation of the object. The method also includes alerting the user to an alignment dimension based upon the manipulation input, receiving confirmation input from the user to engage the alignment dimension, and constraining at least one dimension of movement of the object according to the alignment dimension.

20 Claims, 8 Drawing Sheets

(56) References Cited

OTHER PUBLICATIONS

Caixia Cai et al., "Uncalibrated 3D stereo image-based dynamic visual servoing for robot manipulators", IEEE.org, IEEE Xplore Digital Library, 2013 IEEE/RSJ International Conference on Intelligent Robots and Systems, Nov. 3-7, 2013, Tokyo, Japan, DOI: 10.1109/IROS.2013.6696333, https://ieeexplore.ieee.org/document/6696333/ (2 pages total).

* cited by examiner

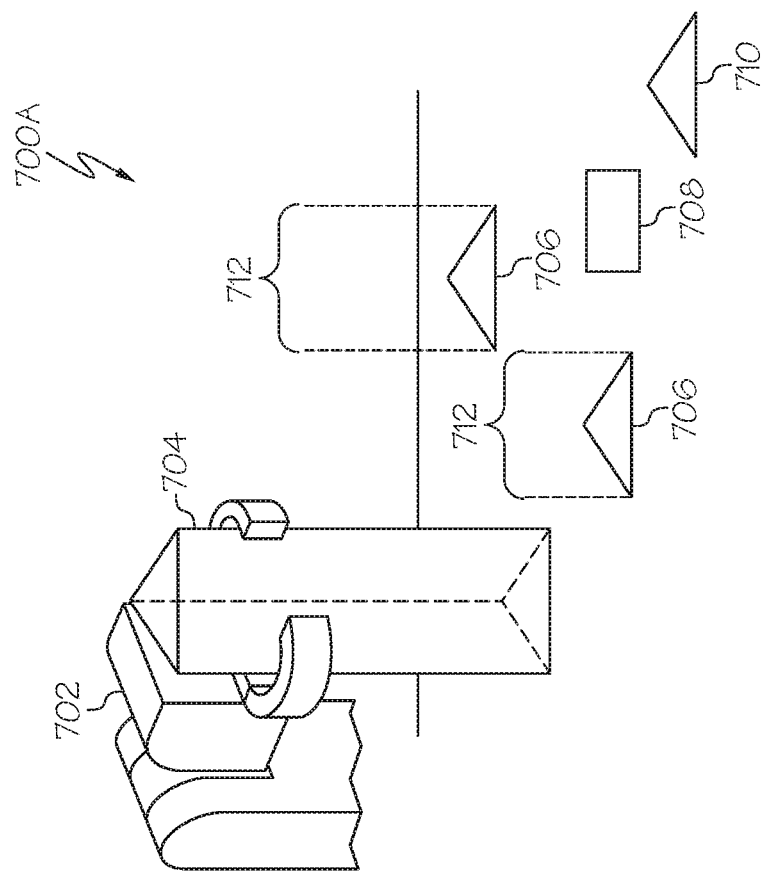
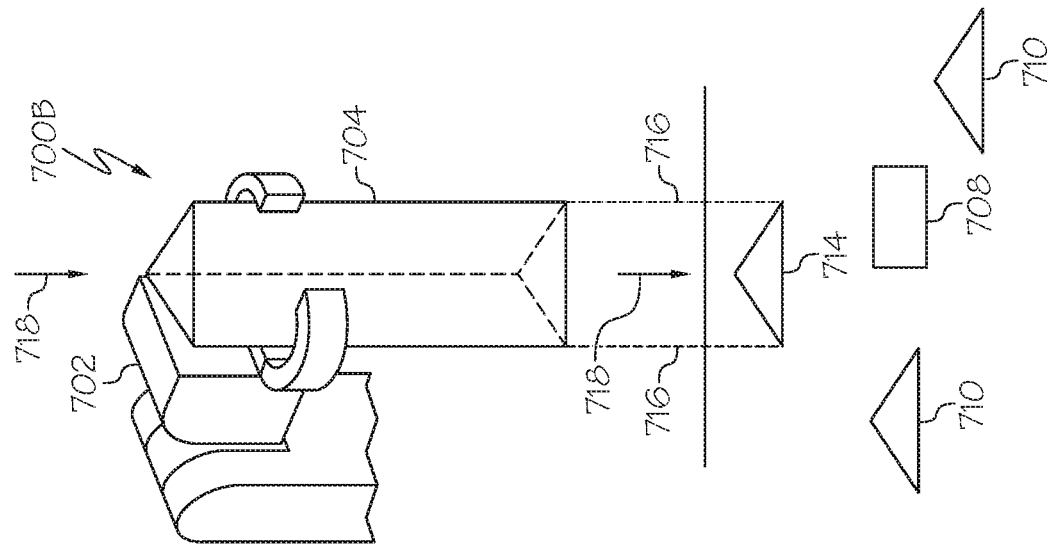
FIG. 7A
FIG. 7B

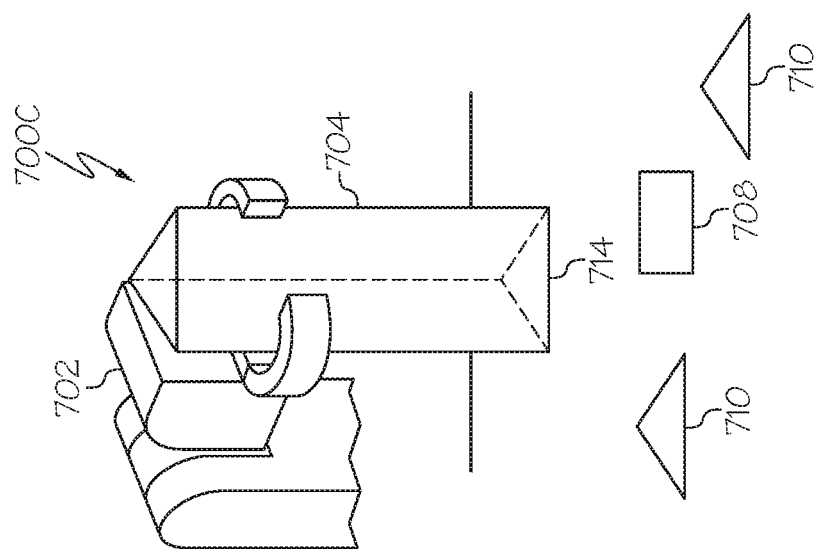

SYSTEMS AND METHODS FOR DIMENSIONALLY-RESTRICTED ROBOTIC TELEOPERATION

TECHNICAL FIELD

The present application generally relates to telematic robot control and, more particularly, to dimensional restriction during teleoperation of a robot.

BACKGROUND

Users utilize remote robots to perform a variety of tasks. Some tasks, such as precise manipulation of particular objects, can require that users be very precise when controlling a robot. This can often require teleoperative users to expend extra time and/or concentration in order to be able to exercise the high degree of precision necessary in such situations. At the same time, teleoperative users also face an increased risk of not achieving proper results, such as proper object alignment, in situations that require high precision.

Accordingly, a need exists to improve the accuracy of teleoperative control for robots interacting with real-world objects.

SUMMARY

A method includes providing a virtual representation of an environment of a robot, the virtual representation including an object representation of an object in the environment. The method further includes receiving manipulation input from a user to teleoperate the robot for manipulation of the object, alerting the user to an alignment dimension based upon the manipulation input, receiving confirmation input from the user to engage the alignment dimension and constraining at least one dimension of movement of the object according to the alignment dimension.

In another embodiment, a system includes an interface component configured to provide a virtual representation of an environment of a robot, the virtual representation including an object representation of an object in the environment. The system also includes a control device configured to receive manipulation input to control the robot. The system further includes a processor, coupled to memory, with the processor being configured to alert the user to an alignment dimension based upon the manipulation input, receive confirmation input from the user to engage the alignment dimension, and constrain at least one dimension of movement of the object according to the alignment dimension.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 7A illustrates a side view of a robot manipulating an object towards various openings with a subset of openings being identified as candidates for the object, according to one or more embodiments described and illustrated herein;

FIG. 7B illustrates a side view of the robot depicted in FIG. 7A manipulating the object with dimensionally-restricted movement towards a selected opening, according to one or more embodiments described and illustrated herein; and FIG. 7C illustrates a side view of the robot depicted in FIG. 7B having precisely placed the object in the selected opening, according to one or more embodiments described and illustrated herein.

DETAILED DESCRIPTION

Embodiments of the present disclosure are directed to a user teleoperating a robot to manipulate an object. More specifically, the object may need to be manipulated in a precise manner, particularly with respect to one or more particular dimensions. This means that user input into other dimensions may need to be constrained or ignored to assure that the movement of the object stays within the restricted dimension(s). Various embodiments of dimensional-restriction for teleoperated robots are described in detail below.

Figure 1:
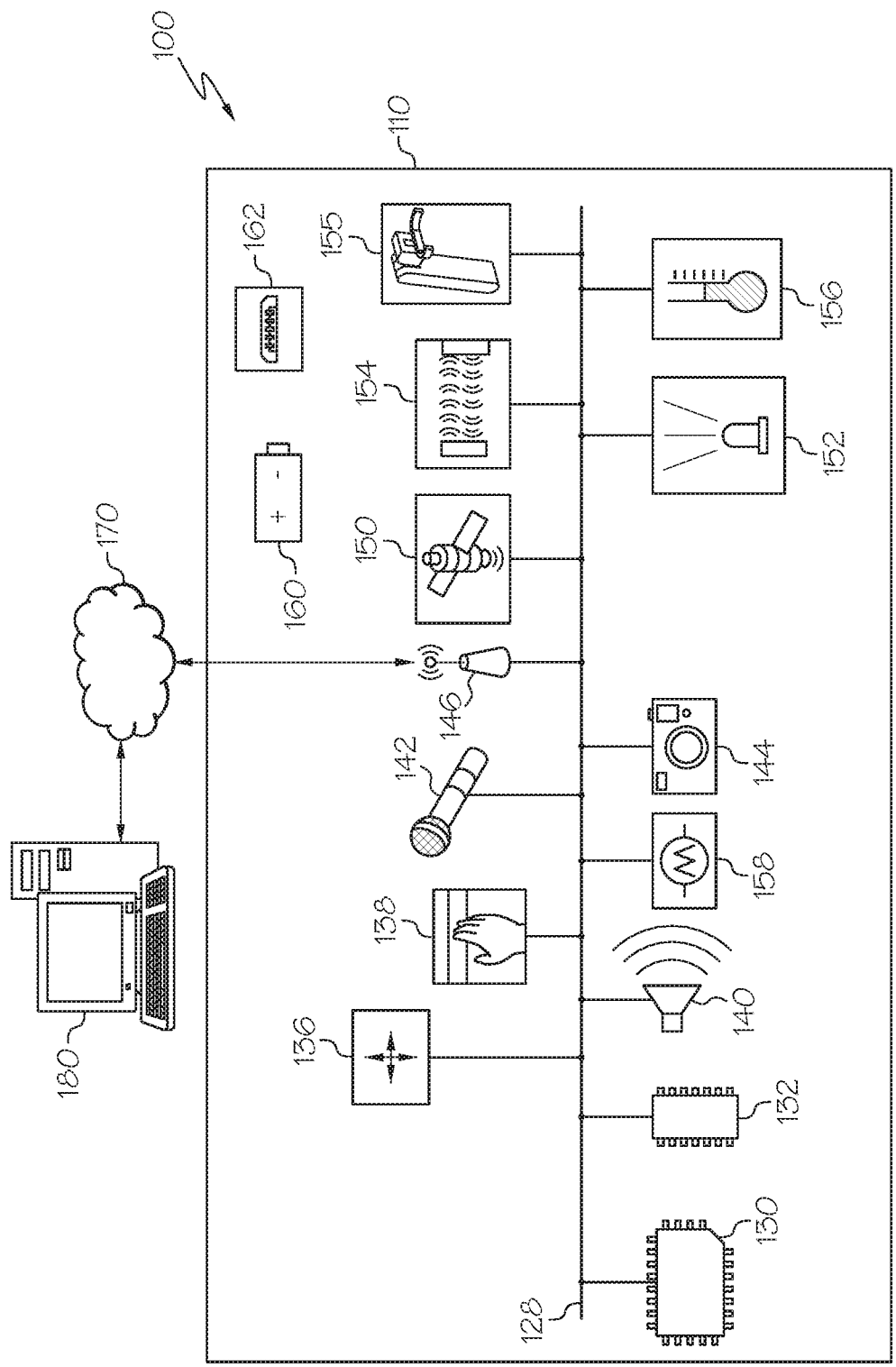
FIG. 1 is a block diagram illustrating hardware utilized in one or more robots for implementing various processes, media, and systems, according to one or more embodiments shown and described herein.

Referring now to FIG. 1, example components of one embodiment of a robot 100 are schematically depicted. The robot 100 includes a housing 110, a communication path 128, a processor 130, a memory module 132, an inertial measurement unit 136, an input device 138, an audio output device 140 (e.g., a speaker), a microphone 142, a camera 144, network interface hardware 146, a location sensor 150, a light 152, a proximity sensor 154, one or more arms 155, a temperature sensor 156, a mobility actuator 158, a battery 160, and a charging port 162. The components of the robot 100 other than the housing 110 may be contained within or mounted to the housing 110. The various components of the robot 100 and the interaction thereof will be described in detail below.

Still referring to FIG. 1, the communication path 128 may be formed from any medium that is capable of transmitting a signal such as, for example, conductive wires, conductive traces, optical waveguides, or the like. Moreover, the communication path 128 may be formed from a combination of mediums capable of transmitting signals. In one embodiment, the communication path 128 comprises a combination of conductive traces, conductive wires, connectors, and buses that cooperate to permit the transmission of electrical data signals to components such as processors, memories, sensors, input devices, output devices, and communication devices. Accordingly, the communication path 128 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 128 communicatively couples the various components of the robot 100. As used herein, the term "communicatively coupled" means that coupled components are capable of exchanging data signals with one another such as, for example, electrical signals via conductive medium, electromagnetic signals via air, optical signals via optical waveguides, and the like.

The processor 130 of the robot 100 may be any device capable of executing machine-readable instructions. Accordingly, the processor 130 may be a controller, an integrated circuit, a microchip, a computer, or any other computing device. The processor 130 is communicatively coupled to the other components of the robot 100 by the communication path 128. Accordingly, the communication path 128 may communicatively couple any number of processors with one another, and allow the components coupled to the communication path 128 to operate in a distributed computing environment. Specifically, each of the components may operate as a node that may send and/or receive data. While the embodiment depicted in FIG. 1 includes a single processor 130, other embodiments may include more than one processor.

Still referring to FIG. 1, the memory module 132 of the robot 100 is coupled to the communication path 128 and communicatively coupled to the processor 130. The memory module 132 may comprise RAM, ROM, flash memories, hard drives, or any non-transitory memory device capable of storing machine-readable instructions such that the machine-readable instructions can be accessed and executed by the processor 130. The machine-readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable instructions and stored in the memory module 132. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 1 includes a single memory module 132, other embodiments may include more than one memory module.

The inertial measurement unit 136, if provided, is coupled to the communication path 128 and communicatively coupled to the processor 130. The inertial measurement unit 136 may include one or more accelerometers and one or more gyroscopes. The inertial measurement unit 136 transforms sensed physical movement of the robot 100 into a signal indicative of an orientation, a rotation, a velocity, or an acceleration of the robot 100. The operation of the robot 100 may depend on an orientation of the robot 100 (e.g., whether the robot 100 is horizontal, tilted, and the like). Some embodiments of the robot 100 may not include the inertial measurement unit 136, such as embodiments that include an accelerometer but not a gyroscope, embodiments that include a gyroscope but not an accelerometer, or embodiments that include neither an accelerometer nor a gyroscope.

Still referring to FIG. 1, one or more input devices 138 are coupled to the communication path 128 and communicatively coupled to the processor 130. The input device 138 may be any device capable of transforming user contact into a data signal that can be transmitted over the communication path 128 such as, for example, a button, a switch, a knob, a microphone or the like. In some embodiments, the input device 138 includes a power button, a volume button, an activation button, a scroll button, or the like. The one or more input devices 138 may be provided so that the user may interact with the robot 100, such as to navigate menus, make selections, set preferences, and other functionality described herein. In some embodiments, the input device 138 includes a pressure sensor, a touch-sensitive region, a pressure strip, or the like. It should be understood that some embodiments may not include the input device 138. As described in more detail below, embodiments of the robot 100 may include multiple input devices disposed on any surface of the housing 110. In some embodiments an input device 138 may include force sensors to detect an amount of force being exerted by and/or upon the robot 100 and/or tactile sensors to provide a sense of touch.

The speaker 140 (i.e., an audio output device) is coupled to the communication path 128 and communicatively coupled to the processor 130. The speaker 140 transforms audio message data from the processor 130 of the robot 100 into mechanical vibrations producing sound. For example, the speaker 140 may provide to the user navigational menu information, setting information, status information, information regarding the environment as detected by image data from the one or more cameras 144, and the like. However, it should be understood that, in other embodiments, the robot 100 may not include the speaker 140.

The microphone 142 is coupled to the communication path 128 and communicatively coupled to the processor 130. The microphone 142 may be any device capable of transforming a mechanical vibration associated with sound into an electrical signal indicative of the sound. The microphone 142 may be used as an input device 138 to perform tasks, such as navigate menus, input settings and parameters, and any other tasks. It should be understood that some embodiments may not include the microphone 142.

Still referring to FIG. 1, the camera 144 is coupled to the communication path 128 and communicatively coupled to the processor 130. The camera 144 may be any device having an array of sensing devices (e.g., pixels) capable of detecting radiation in an ultraviolet wavelength band, a visible light wavelength band, or an infrared wavelength band. The camera 144 may have any resolution. The camera 144 may be an omni-directional camera, or a panoramic camera. In some embodiments, one or more optical components, such as a mirror, fish-eye lens, or any other type of lens may be optically coupled to the camera 144.

The network interface hardware 146 is coupled to the communication path 128 and communicatively coupled to the processor 130. The network interface hardware 146 may be any device capable of transmitting and/or receiving data via a network 170. Accordingly, network interface hardware 146 can include a wireless communication module configured as a communication transceiver for sending and/or receiving any wired or wireless communication. For example, the network interface hardware 146 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 146 includes hardware configured to operate in accordance with the Bluetooth wireless communication protocol. In another embodiment, network interface hardware 146 may include a Bluetooth send/receive module for sending and receiving Bluetooth communications to/from an interface device 180. The network interface hardware 146 may also include a radio frequency identification ("RFID") reader configured to interrogate and read RFID tags.

In some embodiments, the robot 100 may be communicatively coupled to an interface device 180 via the network 170. In some embodiments, the network 170 is a personal area network that utilizes Bluetooth technology to communicatively couple the robot 100 and the interface device 180. In other embodiments, the network 170 may include one or more computer networks (e.g., a personal area network, a local area network, or a wide area network), cellular networks, satellite networks and/or a global positioning system and combinations thereof. Accordingly, the robot 100 can be communicatively coupled to the network 170 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 1, as stated above, the network 170 may be utilized to communicatively couple the robot 100 with the interface device 180. As discussed in more detail below with respect to FIG. 3, the interface device 180 may include a tablet, mobile phone, a smartphone, a personal digital assistant, a camera, a dedicated mobile media player, a mobile personal computer, a wearable computing device (such as a headset for virtual reality or glasses for augmented reality), a desktop computer, a server, a laptop computer, an imaging device, and/or any other electronic device capable of being communicatively coupled with the robot 100. The interface device 180 may include one or more processors and one or more memories. The one or more processors can execute logic to communicate with the robot 100. The interface device 180 may be configured with wired and/or wireless communication functionality for communicating with the robot 100. In some embodiments, the interface device 180 may perform one or more elements of the functionality described herein, such as in embodiments in which the functionality described herein is distributed between the robot 100 and the interface device 180.

The location sensor 150 is coupled to the communication path 128 and communicatively coupled to the processor 130. The location sensor 150 may be any device capable of generating an output indicative of a location. In some embodiments, the location sensor 150 includes a global positioning system (GPS) sensor, though embodiments are not limited thereto. Some embodiments may not include the location sensor 150, such as embodiments in which the robot 100 does not determine a location of the robot 100 or embodiments in which the location is determined in other ways (e.g., based on information received from the camera 144, the microphone 142, the network interface hardware 146, the proximity sensor 154, the inertial measurement unit 136 or the like). The location sensor 150 may also be configured as a wireless signal sensor capable of triangulating a location of the robot 100 and the user by way of wireless signals received from one or more wireless signal antennas.

The mobility actuator 158 is coupled to the communication path 128 and communicatively coupled to the processor 130. As described in more detail below, the mobility actuator 158 may be or otherwise include a motorized wheel assembly that includes one or more motorized wheels that are driven by one or more motors. In other embodiments, the mobility actuator 158 may include one or more limbs (with or without joints) such as legs, arms, or anything else that may be utilized by the robot 100 for walking, crawling, swimming, self-pulling/dragging across a surface, etc. In some embodiments, limbs may include webbing or any suitable configuration and/or material that may utilized for travelling within and/or under water. In other embodiments the mobility actuator 158 may include sails, propellers, and/or turbines for underwater mobility. In still other embodiments, the mobility actuator 158 may include wings, propellers, and/or turbines for air travel/flight, which may include hovering.

The processor 130 may provide one or more drive signals to the mobility actuator 158 to, for example, actuate motorized wheels in a motorized wheel assembly such that the robot 100 travels to a desired location. This may be a location that the user wishes to acquire environmental information (e.g., the location of particular objects within at or near the desired location), or a location from which the robot 100 may manipulate an object as desired by the user.

Still referring to FIG. 1, the light 152 is coupled to the communication path 128 and communicatively coupled to the processor 130. The light 152 may be any device capable of outputting light, such as, but not limited to, a light emitting diode, an incandescent light, a fluorescent light, or the like. Some embodiments include a power indicator light that is illuminated when the robot 100 is powered on. Some embodiments include an activity indicator light that is illuminated when the robot 100 is active or processing data. Some embodiments include an illumination light for illuminating the environment in which the robot 100 is located. Some embodiments may not include the light 152.

The proximity sensor 154 is coupled to the communication path 128 and communicatively coupled to the processor 130. The proximity sensor 154 may be any device capable of outputting a proximity signal indicative of a proximity of the robot 100 to another object. In some embodiments, the proximity sensor 154 may include a laser scanner, a capacitive displacement sensor, a Doppler effect sensor, an eddy-current sensor, an ultrasonic sensor, a magnetic sensor, an optical sensor, a radar sensor, a lidar sensor, a sonar sensor, or the like. Some embodiments may not include the proximity sensor 154, such as embodiments in which the proximity of the robot 100 to an object is determine from inputs provided by other sensors (e.g., the camera 144, the speaker 140, etc.) or embodiments that do not determine a proximity of the robot 100 to an object. One or more arms 155 may be utilized and feature any number of joints, effectuators, force sensors, tactile sensors, and the like.

The temperature sensor 156 is coupled to the communication path 128 and communicatively coupled to the processor 130. The temperature sensor 156 may be any device capable of outputting a temperature signal indicative of a temperature sensed by the temperature sensor 156. In some embodiments, the temperature sensor 156 may include a thermocouple, a resistive temperature device, an infrared sensor, a bimetallic device, a change of state sensor, a thermometer, a silicon diode sensor, or the like. Some embodiments of the robot 100 may not include the temperature sensor 156.

Still referring to FIG. 1, the robot 100 is powered by the battery 160, which is electrically coupled to the various electrical components of the robot 100. The battery 160 may be any device capable of storing electric energy for later use by the robot 100. In some embodiments, the battery 160 is a rechargeable battery, such as a lithium-ion battery or a nickel-cadmium battery. In embodiments in which the battery 160 is a rechargeable battery, the robot 100 may include the charging port 162, which may be used to charge the battery 160. Some embodiments may not include the battery 160, such as embodiments in which the robot 100 is powered the electrical grid, by solar energy, or by energy harvested from the environment. Some embodiments may not include the charging port 162, such as embodiments in which the apparatus utilizes disposable batteries for power.

Figure 2:
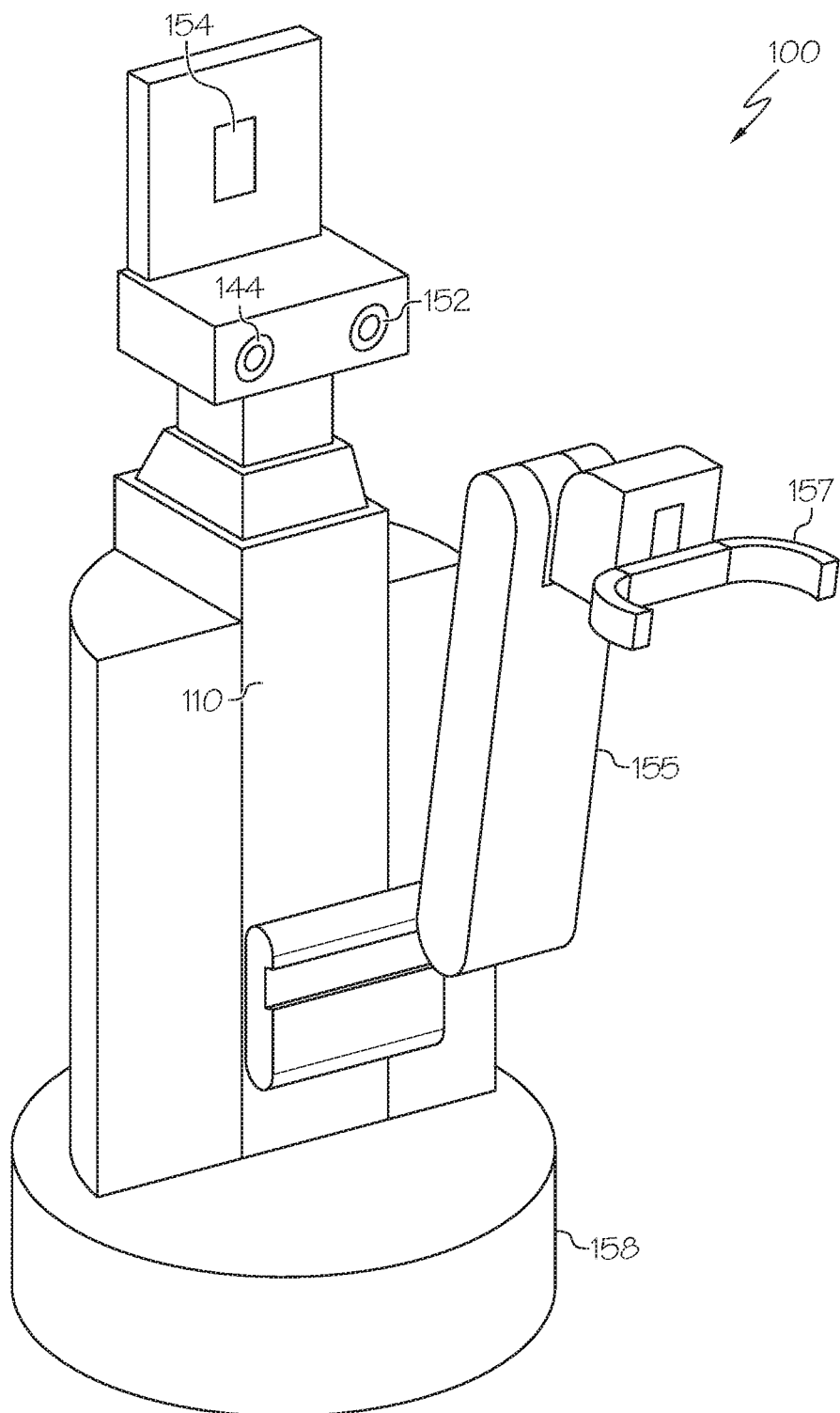
FIG. 2 schematically illustrates a top perspective view of an example robot according to one or more embodiments described and illustrated herein.

Referring now to FIG. 2, the physical configuration of the robot 100 is schematically illustrated. The robot 100 may be of any suitable size, height, weight, dimensions, etc. Generally, the robot 100 includes a housing 110, a camera 144, a light 152, and a base portion having a mobility actuator 158, which in this embodiment is a motorized wheel assembly. The robot 100 includes a proximity sensor 154 at a top portion of the robot 100 above the camera 144 and the light 152, though in other embodiments the proximity sensor 154 may be positioned at a different location. Any number of proximity sensors 154 may be provided. As described above with respect to FIG. 1, the proximity sensor 154 may generate one or more signals based on the presence of one or more objects. The proximity sensor(s) 154 may be used by the robot 100 to detect objects (e.g., anything with which the example robot 100 can interact) and/or avoid obstacles (e.g., people, furniture, stairs, walls, and the like) as it navigates within the environment, fully autonomously, partially autonomously, under user teleoperative control, or the like.

The robot 100 may feature one or more arms 155. In this embodiment the arm 155 utilizes an interaction effectuator 157 to interact with objects, such as picking them up. Any suitable type of arm 155 may be utilized, and may feature any suitable number, configuration, and/or type of interaction effectuators 157. It should be understood that the arrangement of the components depicted in FIG. 2 is for illustrative purposes only, and that embodiments are not limited thereto. Portions of the robot 100 may be made of a material that is substantially transparent to the wavelength of the radiation detected by the camera 144 (e.g., wavelengths within the visual spectrum). Any suitable number of cameras may be utilized. In some embodiments, the camera 144 is configured to capture omni-directional image data. For example, the camera 144 may rotate about an axis to capture image data about three-hundred and sixty degrees surrounding the robot 100. Further, the camera 144 may be configured to automatically tilt up and down and/or pan left and right to capture additional image data that would otherwise be out of view if the camera 144 did not tilt up and down.

Figure 3:
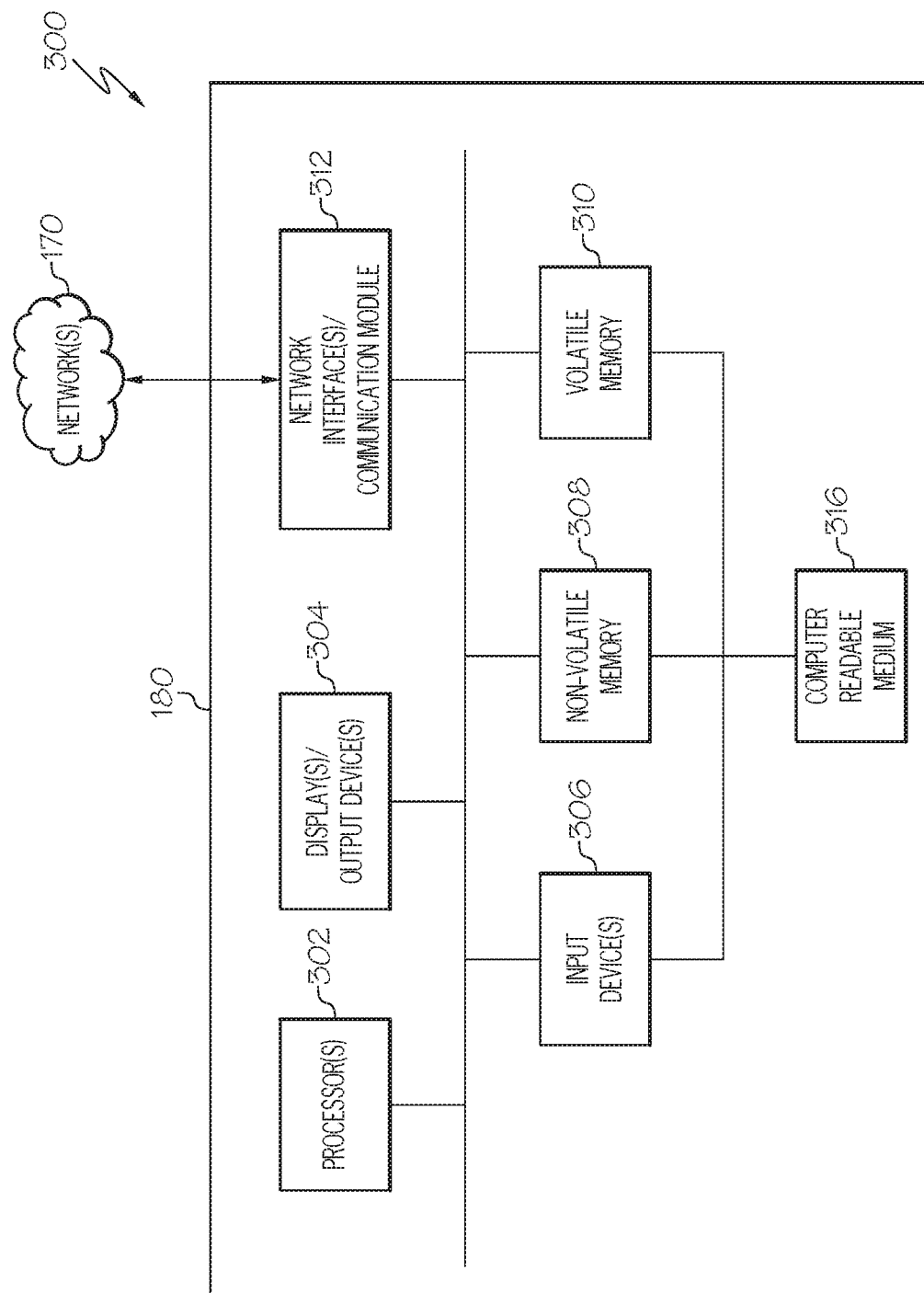
FIG. 3 is a block diagram illustrating computing hardware utilized in one or more devices for implementing various processes, media, and systems, according to one or more embodiments shown and described herein.

Turning to FIG. 3, a block diagram illustrates an exemplary computing environment 300 through which embodiments of the disclosure can be implemented, such as, for example, in the interface device 180 depicted in FIG. 1. The interface device 180 described herein is but one example of a suitable computing device and does not suggest any limitation on the scope of any embodiments presented. Nothing illustrated or described with respect to the interface device 180 should be interpreted as being required or as creating any type of dependency with respect to any element or plurality of elements. In various embodiments, an interface device 180 may include, but need not be limited to, a tablet, mobile phone, a smartphone, a personal digital assistant, a camera, a dedicated mobile media player, a mobile personal computer, a wearable computing device (such as a headset for virtual reality or glasses for augmented reality), a desktop computer, a server, a laptop computer, an imaging device, and/or any other electronic device capable of being communicatively coupled with the robot 100. An interface device 180 in some embodiments may include an interface component as well as a control device. In an embodiment, the interface device 180 includes at least one processor 302 and memory (non-volatile memory 308 and/or volatile memory 310). The interface device 180 may include non-volatile memory 308 (ROM, flash memory, etc.), volatile memory 310 (RAM, etc.), or a combination thereof. In some embodiments, the at least one processor 302 is coupled to the non-volatile memory 308 and/or volatile memory 310. The interface device 180 may utilize, by way of non-limiting example, RAM, ROM, cache, fiber optics, EPROM/Flash memory, CD/DVD/BD-ROM, hard disk drives, solid-state storage, optical or magnetic storage devices, diskettes, electrical connections having a wire, any system or device that is of a magnetic, optical, semiconductor, or electronic type, or any combination thereof.

The interface device 180 can include one or more displays and/or output devices 304 such as monitors, speakers, headphones, projectors, wearable-displays, holographic displays, and/or printers, for example. An output device 304 may be any device capable of providing tactile feedback to a user, and may include a vibration device (such as in embodiments in which tactile feedback is delivered through vibration), an air blowing device (such as in embodiments in which tactile feedback is delivered through a puff of air), or a pressure generating device (such as in embodiments in which the tactile feedback is delivered through generated pressure). In some embodiments one or more output devices 304 may constitute an interface component.

The interface device 180 may further include one or more input devices 306 which can include, by way of example, any type of mouse, keyboard, disk/media drive, memory stick/thumb-drive, memory card, pen, joystick, gamepad, touch-input device, biometric scanner, voice/auditory input device, motion-detector, camera, scale, etc. In some embodiments one or more input devices 306 may constitute a control device.

A network interface 312 can facilitate communications over a network 314 via wires, via a wide area network, via a local area network, via a personal area network, via a cellular network, via a satellite network, etc. Suitable local area networks may include wired Ethernet and/or wireless technologies such as, for example, wireless fidelity (Wi-Fi).

Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. The interface device 180 may include one or more network interfaces 312 to facilitate communication with one or more remote devices, which may include, for example, client and/or server devices. A network interface 312 may also be described as a communications module, as these terms may be used interchangeably. Network interface 312 can be communicatively coupled to any device capable of transmitting and/or receiving data via one or more networks 170, which may correspond to the network 170 in FIG. 1. In other embodiments different networks may be accessed to facility connectivity, such that network 170 need not be or even be in direct communication with the network 170 in FIG. 1, such as where one or more other networks may serve as intermediary networks. The network interface hardware 312 can include a communication transceiver for sending and/or receiving any wired or wireless communication.

For example, the network interface hardware 312 may include an antenna, a modem, LAN port, Wi-Fi card, WiMax card, mobile communications hardware, near-field communication hardware, satellite communication hardware and/or any wired or wireless hardware for communicating with other networks and/or devices.

A computer-readable medium 316 may comprise a plurality of computer readable mediums, each of which may be either a computer readable storage medium or a computer readable signal medium. A computer readable medium 316 may reside, for example, within an input device 306, non-volatile memory 308, volatile memory 310, or any combination thereof. A computer readable storage medium can include tangible media that is able to store instructions associated with, or used by, a device or system. A computer readable storage medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media exclude propagated signals and carrier waves.

Figure 4:
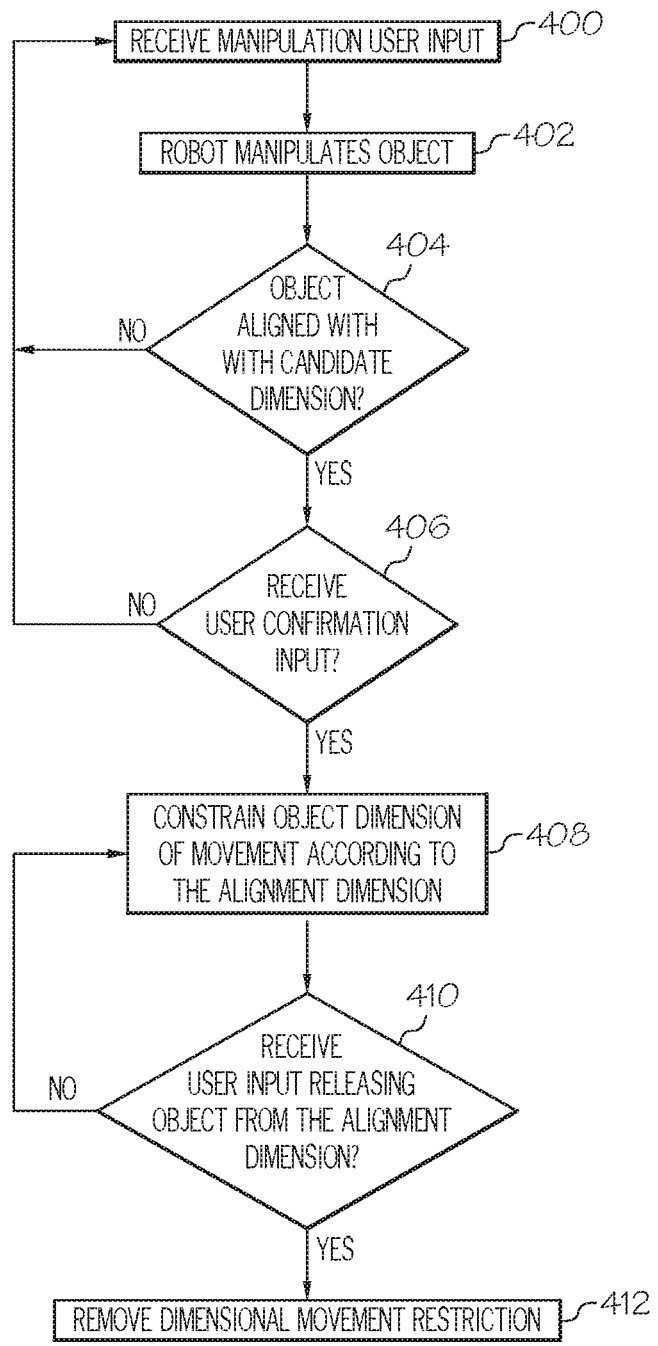
FIG. 4 illustrates a flowchart for entering and exiting a dimensionally-restricted mode of robotic teleoperation, according to one or more embodiments described and illustrated herein.

Turning to FIG. 4, a flowchart for entering and exiting a dimensionally-restricted mode of robotic teleoperation is presented, according to one embodiment. At block 400, a teleoperative user's input to control a robot may be received, such as through an input device and/or a control device, along with an interface component that may provide a virtual representation of an environment of a robot. In some embodiments, the virtual representation may be output on a display of the one or more output devices 304 of the interface device 180. In this embodiment, the virtual representation is a point cloud produced by one or more lidar sensors utilized by the robot. In other embodiments, any suitable type of data and/or sensor(s) (such as the proximity sensor 154 discussed above) may be utilized to obtain and produce a representation of the environment of the robot, which in some embodiments may be referred to as a virtual representation.

At block 402, responsive to the teleoperative user's input, the robot 100 may manipulate an object within the environment, such as when the robot 100 grasps the object with the effectuator 157 of the arm 155. An object may be anything with which a robot is capable of physically interacting. At block 404, as the robot manipulates the object (e.g., moves the grasped object within the environment of the robot 100 by utilizing the mobility actuator 158 and/or the arm 155), a determination is made as to whether the object is aligned to an alignment dimension. For example, the length of a rod may be compared to an alignment dimension, such that the rod is aligned to an alignment dimension when the length of the rod has the same orientation as the alignment dimension. Alignment dimensions may correspond to any suitable dimension, such as height, depth, width, yaw, pitch, and roll. An alignment dimension may have any suitable orientation and may be in relation to one or more specific locations and/or one or more objects in the environment of the robot. In some embodiments an alignment dimension may be an alignment axis. If the object is not aligned to an alignment dimension, then the flowchart returns back to block 400 to receive further teleoperative user input.

Referring back to block 404, if the object is or becomes aligned with an alignment dimension, then the flowchart proceeds to block 406, where a determination is made as to whether a user has provided confirmation input to restrict dimensional movement(s) of the object, whereby the robot does not manipulate/move the object according to any constrained dimension. Some embodiments may provide a user prompt based upon the positioning and/or location of the object, whereas other embodiments may automatically trigger constrained object manipulation based upon positioning and/or location of the object without providing a user prompt. As discussed in more detail below with respect to FIG. 5, user input may be utilized to confirm that the object being manipulated by the robot has been "snapped-to" the alignment dimension, and thereby limiting movement of the object with respect to other dimensions (i.e., the constrained dimension(s)). In this embodiment, if confirmation input regarding a possible alignment dimension is not received from the user at block 406, then the flowchart returns back to block 400 to receive further teleoperative user input. Otherwise, if confirmation input regarding a possible alignment dimension is received from the user at block 406, then the flowchart proceeds to block 408, where object manipulation is restricted according to the one or more dimensions of movement restriction. Once the object being manipulated by the robot is aligned with an alignment dimension, movement in one or more of the other dimensions may be restricted. For example, if a user's input moves or orients the object in a way that at least partially involves a constrained dimension, the movement may only proceed with respect to non-constrained dimension(s), such as the alignment dimension. Further examples are discussed in more detail below with respect to FIGS. 6 and 7. In some embodiments, the flowchart may represent a state diagram for how user input is processed, such that the robot continuously performs a command according to its programming.

At block 410, a determination is made as to whether input has been received from the user to remove the dimension constraint(s). This may be in response to, for example, a prompt to the user based upon positioning and/or location of the object. In other embodiments, dimension constraints may be removed automatically without a user prompt, based upon positioning and/or location of the object. If such user input to remove the dimension constraint(s) is not received, then the flowchart returns back to block 408 where object manipulation continues being restricted according to the one or more dimensions of movement restriction. If such user input to remove the dimension constraint(s) is received, the flowchart proceeds to block 412, where all dimensions of movement restriction are removed such that the robot 100 may be teleoperatively controlled by the user via the interface device 180 without restriction. In some embodiments, if there is more than one dimension of movement restriction, a subset of the dimensions of movement restriction may be removed, where user input may specify which of a plurality of dimensions of movement are to be removed or maintained.

Figure 5:
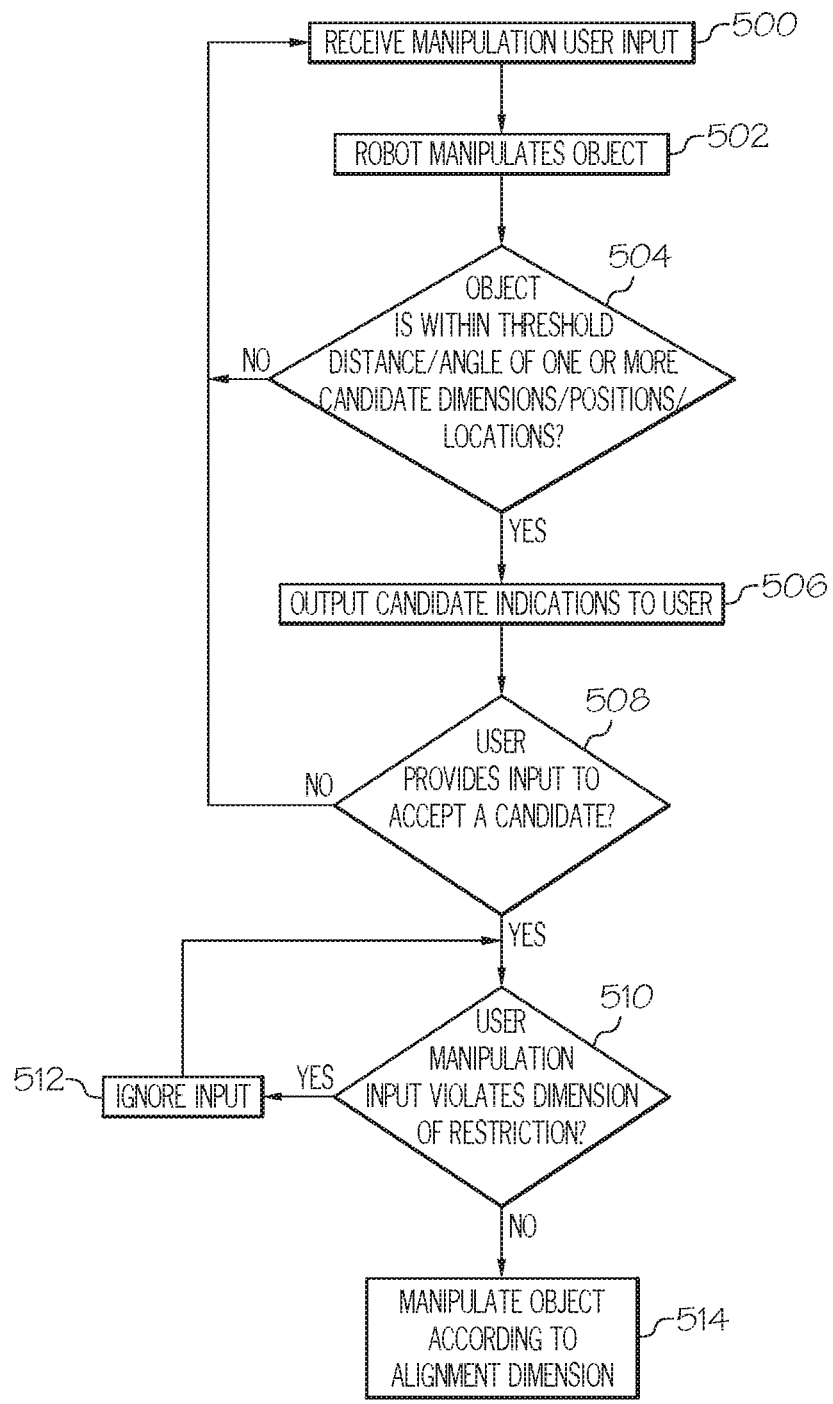
FIG. 5 illustrates a flowchart for providing alignment dimension candidates for dimensionally-restricted modes of robotic teleoperation, according to one or more embodiments described and illustrated herein.

Turning to FIG. 5, a flowchart for providing alignment dimension candidates for dimensionally-restricted modes of robotic teleoperation is presented. At block 500, a teleoperative user's input to control a robot may be received, such as through an input device and/or a control device, along with an interface component that may provide a virtual representation of an environment of a robot. At block 502, responsive to the teleoperative user's input, the robot may manipulate an object within the robot's environment. At block 504 a determination is made as to whether the object is within a threshold distance and/or angle of one or more candidate dimensions, positions, and/or locations ("candidate") within the environment of the robot. If not, then the flowchart returns back to block 500 to receive further teleoperative user input.

If the object is within a threshold distance and/or angle of an alignment dimension, then the flowchart proceeds to block 506, where indications of candidate dimensions, positions, and/or locations are provided to the user in the virtual view of the robot's environment (e.g., by displaying the candidates to the user on a display of the one or more output devices 304 of the interface device 180), and the flowchart then proceeds to block 508. Any combination of candidate dimensions (i.e., candidate alignment dimensions), positions, and/or locations may be provided to the user. For example, having the robot hold the object at a certain orientation or within an orientation range may make it eligible for a candidate alignment dimension and/or a candidate position (based upon an orientation/pose). Continuing with this example, having the object located within a threshold distance of a location within the environment of the robot may make it eligible to be subject to one or more candidate alignment dimensions. The indication of a candidate dimension may be anything that can alert the user, and may be provided by one or more output devices 304, such as a display, speaker, tactile-feedback device, etc. For example, overlaid graphics, blinking/flashing graphics, one or more dotted lines, or any suitable type of visual indication may be utilized. Any type of audio feedback may also be utilized to alert the user to the presence of one or more candidates, such with beeping, a tone, a spoken alert, etc. Tactile feedback may also be provided in the form of a jolt, rumbling, vibration, or any other suitable type of tactile feedback.

At block 508, a determination is made as to whether the user has accepted a candidate to utilize one or more alignment dimensions associated with the candidate. In some embodiments, more than one candidate may be selected where the associated alignment dimensions would be utilized together if possible. If the user does not provide input to accept a candidate, then the flowchart returns back to block 500 to receive further teleoperative user input. If the user does provide input to accept a candidate, then the flowchart proceeds to block 510, where a determination is made as to whether any user teleoperative input violates a dimension of restriction. A dimension of restriction may be any dimension in which movement of an object is restricted, such that a violation of a dimension of restriction may be any attempted movement of the object according to the dimension of restriction. This may occur once an object has been aligned with an alignment dimension, and more than one dimension has been restricted. In this embodiment, if movement of the object includes both one or more alignment dimension(s) and one or more restriction dimension, the robot will only move the object according to the alignment dimension(s), not the restriction dimension(s).

If user teleoperative input violates a dimension of restriction, then the flowchart proceeds to block 512 where any such input is ignored, such that the flowchart then returns back to block 510. For example, once a rod has been aligned with an alignment dimension corresponding to the length of the rod (such as where the rod has been tilted to correspond to the alignment dimension), then the rod may not be moved according to its width or pitch dimensions, which would be dimensions of restriction. In another example, the rod may have two dimensions of alignment in which it may be moved, such as the length and roll dimensions (i.e., moving the rod according to its length and rotating the rod according to its length). Continuing with this example, violating a dimension of restriction could include the user providing teleoperative input to move the rod according to its width, height, pitch, or yaw, with any such movement being ignored. Continuing with this example, if teleoperative input was received to move the rod according to its length and yaw, the rod would only be moved according to the rod's length, not the rod's yaw. If user teleoperative input does not violate a dimension of restriction, then the flowchart proceeds to block 514 where the object is manipulated according to the restriction(s) placed upon its movement (i.e., allowing movement in one or more alignment dimensions to the exclusion of one or more dimension of restrictions).

For illustrative purposes in FIGS. 6A-C and 7A-C, the user's virtual representation view is provided by a camera 144 extending outward from the housing 110 of the robot 100 to provide a side view. Such a configuration is not necessarily utilized in other embodiments, and utilized here merely for illustrative purposes.

Figure 6C:
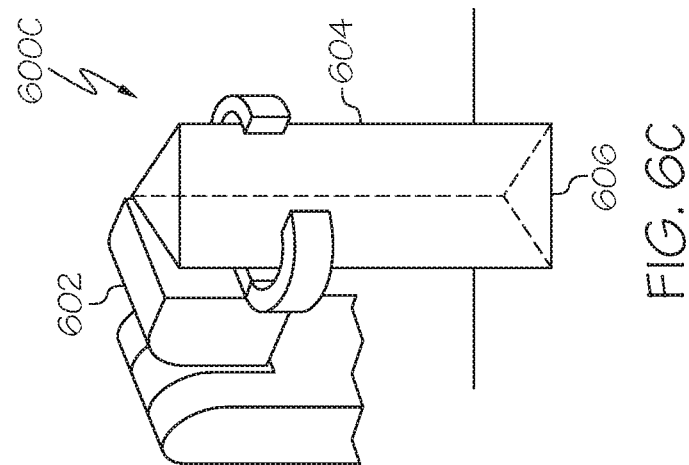
FIG. 6C illustrates a side view of the robot depicted in FIG. 6B having precisely placed the object in the opening, according to one or more embodiments shown and described herein.
Figure 6B:
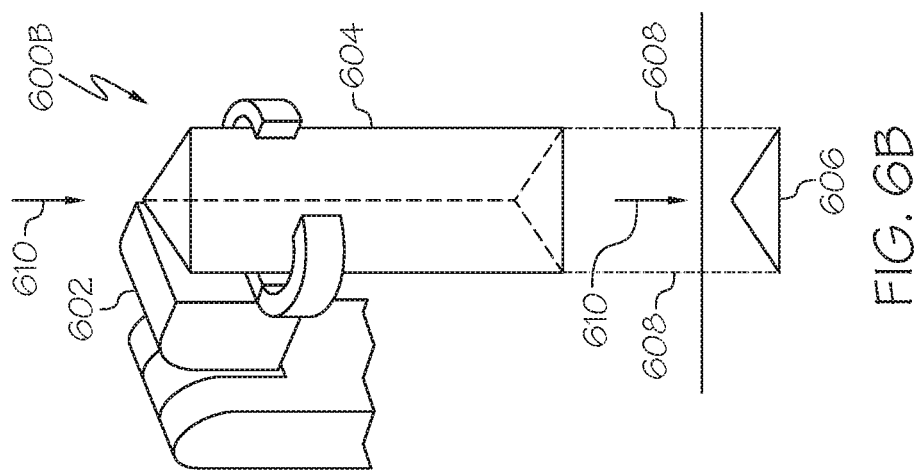
FIG. 6B illustrates a side view of the robot depicted in FIG. 6A manipulating the object with dimensionally-restricted movement towards an opening, according to one or more embodiments shown and described herein.
Figure 6A:
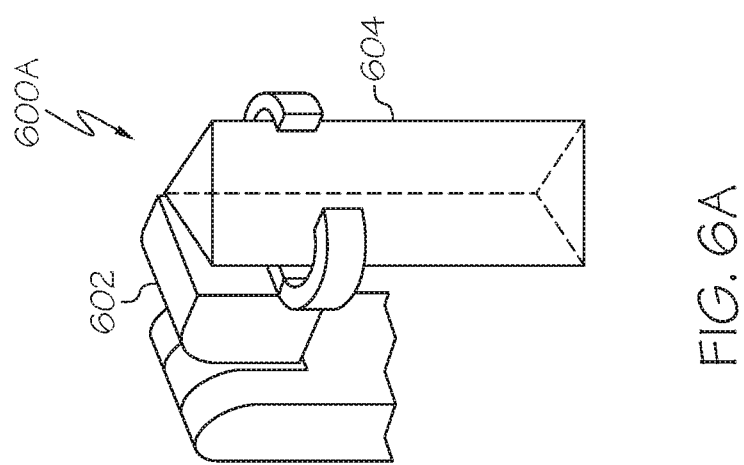
FIG. 6A illustrates a side view of a robot manipulating an object, according to one or more embodiments shown and described herein.

Turning to FIG. 6A, a side view illustrates a virtual representation of an environment 600A of a robot effectuator 602 manipulating an object 604. In this embodiment an effectuator 602 grasps an object 604. Although depicted as a pincer, an effectuator 602 may be anything associated with the robot capable of interacting with an object 604, such as a hand, claw, flat/pointed/curved surface, blade, tentacle, rod, an appendage and the like.

Turning to FIG. 6B, a side view illustrates a virtual representation of the environment 600B of the robot effectuator 602 depicted in FIG. 6A manipulating the object 604 with dimensionally-restricted movement towards an opening 606. Here, an alignment dimension 608 has been engaged with respect to an opening 606 that is compatible with the object 604. In this example the movement 610 of the object 604 as manipulated by the effectuator 602 is restricted to the alignment dimension 608, which is purely vertical in this example. In this way, any user input to make the effectuator 602 move the object 604 in a way that includes movement not purely within the alignment dimension (e.g., side to side movement, tilting the object, etc) will be ignored, while the vertical component of the diagonal movement will occur. In this way, the user can now only move the object 604 according to the alignment dimension 608 (i.e., vertically in this example).

Turning to FIG. 6C, a side view illustrates a virtual representation of the environment 600C of the robot effectuator 602 depicted in FIG. 6B having precisely placed the object 604 in the opening 606 in response to the user providing manipulation input via the one or more input devices 302 of the interface 180 to teleoperate the robot 100 in order to move the object 604 vertically down and into the opening 606. Here, the bottom of the object 604 precisely fits into the opening 606, thus requiring a high degree of precision. In other embodiments, any suitably sized opening 606 could be utilized for interaction with the object. Any type of object manipulation and/or placement may be utilized. For example, an object may be placed precisely based upon the placement of other objects, such as a utensil on a table where a plate and other utensils have already been placed. Continuing with this example, each plate, glass, and utensil has a proper placement location upon a table surface relative to a chair. A user could be provided with a separate alignment dimension 608 each corresponding to a plate, glass, or utensil. In this way, a pre-existing template for a table-setting can be utilized for precise placement without requiring the higher amount of user concentration, fatigue, and/or time that could otherwise be necessary to match such precision.

Turning to FIG. 7A, a side view illustrates a virtual representation of an environment 700A of a robot effectuator 702 manipulating an object 704 towards various openings with a subset of openings being identified as candidate openings 706 for the object 704. Candidate opening notifications 712 (e.g., shown on the virtual representation of the robot's environment that is displayed on the one or more output devices 304 of the interface device 180) may be utilized to alert the user to the presence of candidate openings 706 and corresponding alignment dimensions. Candidate openings 706 are openings located nearby for which the object 704 would be a precise fit. By contrast, an incompatible opening 708 is also present in which the object 704 would not fit, but a candidate opening notification is not provided for the incompatible opening 708. Another criterion for determining candidate openings 706 may also be distance. Here, a far opening 710 is located farther away than the rest of the openings and based upon its distance is not presently a candidate opening and consequently no candidate opening notification is provided. This may due, for example, to the interface utilizing a threshold distance, such that even otherwise suitable openings are not candidate openings if they are outside of the threshold distance with respect to the robot and/or the object 704.

Turning to FIG. 7B, a side view illustrates a virtual representation of the environment 700B of the robot effectuator 702 depicted in FIG. 7A manipulating the object 704 with dimensionally-restricted movement towards a selected opening 714. The user has selected a candidate opening 706 to be a selected opening 714 with a selected alignment dimension 716, which in turn provides for selected dimensional movement 718 in a purely vertical manner according to the selected alignment dimension 716. In other embodiments the selected alignment dimension 716 may utilize any suitable orientation and/or provide movement in some but not all other dimensions.

In some embodiments, utilizing a threshold distance, a magnetic-attraction suggestion may be utilized, where the robot, the object, and/or the user's interface are drawn towards one or more candidates. For example, moving towards a particular candidate may be easier and moving away from the candidate may be more difficult, so as to guide the user towards the candidate. Moreover, some candidates may have a stronger pull than others based upon weightings. Some embodiments may utilize a "ghost" to illustrate to the user the range of motion available by providing a sample motion, such as that of the object, afforded by a particular candidate opening notifications 712, which may also serve as selectable alignment dimension. However, a candidate opening notification 712 may not visually represent all dimensions of available movement associated with an alignment dimension 716 (i.e., where one or more dimensions of movement are restricted but a plurality of dimensions permit movement). In another embodiment, the alignment dimension may be determined based upon prior interactions with the object or prior input provided by the user. In a different embodiment, the user can remove the constraint from a constrained dimension of movement. In yet another embodiment, where there are a plurality of constrained dimensions of movement, the user may remove a subset or all of the plurality of constrained dimensions of movement.

Turning to FIG. 7C, a side view illustrates a virtual representation of the environment 700C of the robot effectuator 702 depicted in FIG. 7B having precisely placed the object 704 in the selected opening 714 in response to the user providing manipulation input via the one or more input devices 302 of the interface 180 to teleoperate the robot 100 in order to move the object 704 vertically down and into the selected opening 714. Here, the bottom of the object 704 fits precisely into the selected opening 714.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
providing a virtual representation of an environment of a robot, wherein the virtual representation comprises an object representation of an object in the environment;
receiving manipulation input from a user to teleoperate the robot for manipulation of the object;
alerting the user to a candidate opening in the virtual representation of the environment for which the object is a fit;
receiving confirmation input from the user to engage the candidate opening in response to alerting the user to the candidate opening;
alerting the user to an alignment dimension based upon the manipulation input;
receiving confirmation input from the user to engage the alignment dimension; and
constraining at least one dimension of movement of the object with respect to the candidate opening according to the alignment dimension.

2. The method of claim 1, wherein alerting the user to the alignment dimension further comprises providing a visual indication in the virtual representation to the user of a suggested alignment dimension, wherein the virtual representation comprises overlaid graphics overlaying the suggested alignment dimension.

3. The method of claim 2, further comprising: providing a plurality of suggested alignment locations where each suggested alignment location of the plurality of suggested alignment locations is made based upon the robot being within a threshold distance of the object representation.

4. The method of claim 2, further comprising: providing the visual indication based upon compatibility of the object with another object within the alignment dimension.

5. The method of claim 1, wherein alerting the user to the alignment dimension comprises providing tactile feedback or audio feedback to the user.

6. The method of claim 1, wherein alerting the user to the alignment dimension comprises providing suggestive control feedback to guide the user towards the alignment dimension.

7. The method of claim 1, wherein constraining the at least one dimension of movement of the object according to the alignment dimension comprises constraining movement of the object to one dimension of movement corresponding to the alignment dimension, wherein movements in all other dimensions are restricted.

8. The method of claim 1, wherein the alignment dimension:
is determined based upon prior interactions with the object or prior input provided by the user; or corresponds to a preexisting template comprising a plurality of alignment locations.

9. The method of claim 1, wherein alerting the user to the alignment dimension further comprises providing to the user a visual representation of how the object would move based upon future receipt of confirmation input from the user to engage the alignment dimension.

10. The method of claim 1, wherein alerting the user to the candidate opening further comprises providing a visual indication in the virtual representation to the user of the candidate opening.

11. The method of claim 1, wherein alerting the user to the candidate opening further comprises determining that the candidate opening is within a predetermined threshold distance from the robot.

12. The method of claim 11, further comprising utilizing a magnetic-attraction to draw the robot towards the candidate opening within the predetermined threshold distance.

13. A system comprising:
an interface component configured to provide a virtual representation of an environment of a robot, wherein the virtual representation comprises an object representation of an object in the environment;
a control device configured to receive manipulation input to control the robot; and
a processor, coupled to memory, the processor being configured to:
alert the user to a candidate opening in the virtual representation of the environment for which the object is a fit;
receive confirmation input from the user to engage the candidate opening in response to alerting the user to the candidate opening;
alert the user to an alignment dimension based upon the manipulation input;
receive confirmation input from the user to engage the alignment dimension; and
constrain at least one dimension of movement of the object with respect to the candidate opening according to the alignment dimension.

14. The system of claim 13, wherein the processor is further configured to alert the user to the alignment dimension by providing a visual indication in the virtual representation to the user of the suggested alignment dimension, wherein the virtual representation comprises overlaid graphics overlaying the suggested alignment dimension.

15. The system of claim 14, wherein the processor is further configured to provide a plurality of suggested alignment locations where each suggested alignment location of the plurality of suggested alignment locations is made based upon the robot being within a threshold distance of the object representation.

16. The system of claim 14, wherein the processor is further configured to provide the visual indication based upon compatibility of the object with another object within the alignment dimension.

17. The system of claim 13, wherein the processor is further configured to alert the user to the alignment dimension by providing tactile feedback or audio feedback to the user.

18. The system of claim 13, wherein the processor is further configured to alert the user to the alignment dimension by providing suggestive control feedback to guide the user towards the alignment dimension.

19. The system of claim 13, wherein the processor is further configured to constrain movement of the object to one dimension of movement corresponding to the alignment dimension, wherein movements in all other dimensions are restricted.

20. The system of claim 13, wherein the alignment dimension corresponds to a preexisting template comprising a plurality of alignment locations.

* * * * *